March 14, 1933. S. BARONI 1,901,719
MEASURING DEVICE
Filed Dec. 15, 1931
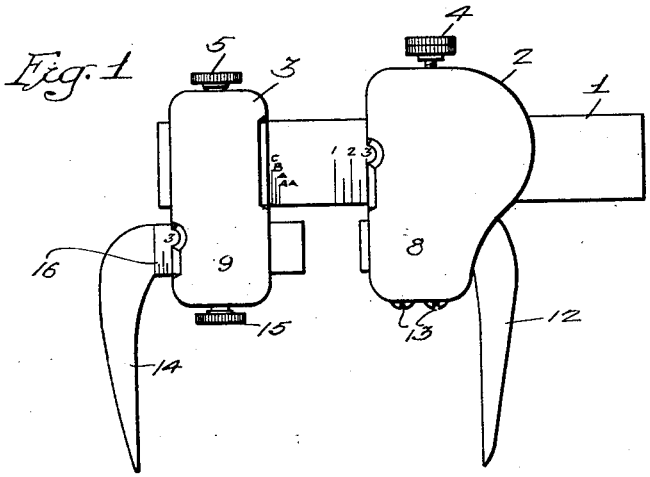
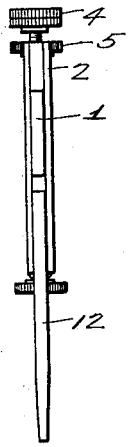
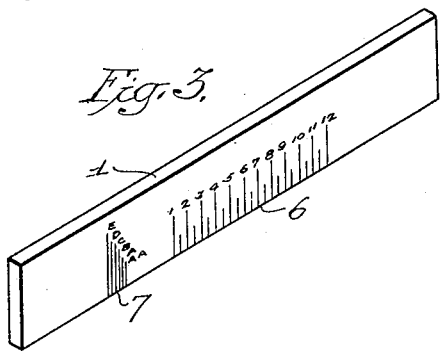
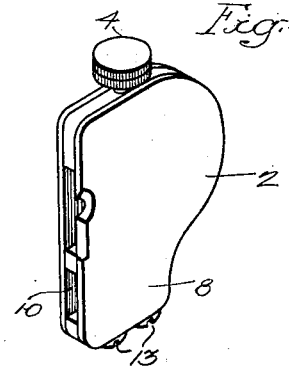
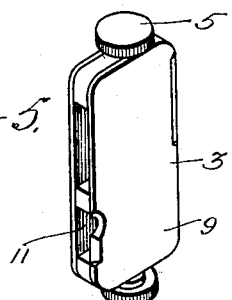
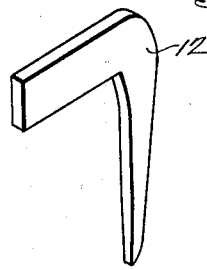
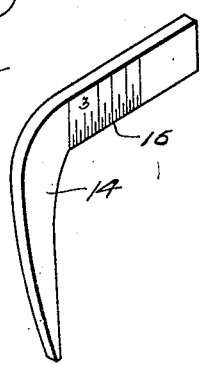
Inventor:
Sante Baroni
by his Attorneys
Howson & Howson Patented Mar. 14, 1933

1,901,719

UNITED STATES PATENT OFFICE

SANTE BARONI, OF PHILADELPHIA, PENNSYLVANIA

MEASURING DEVICE

Application filed December 15, 1931. Serial No. 581,247.

This invention relates to new and useful improvements in gauges or measuring devices for shoes and has for its principal object to provide means for rapidly determining the relative measurements of the vamps of shoes of the various widths in all size ranges.

Another object of the invention is to provide substantially similar means for rapidly determining the relative measurements of the back seam of the various widths of shoes in all ordinary size ranges.

The invention further involves certain features and details of construction which are described in detail hereinafter and disclosed in the accompanying drawing, in which:

Figure 1 is a view in side elevation of the device constituting the invention;

Fig. 2 is a view in end elevation of the disclosure of Fig. 1;

Fig. 3 is a view in perspective of the scale bar of the device;

Fig. 4 is a view in perspective of one of the slidable gauge indexes;

Fig. 5 is a view in perspective of a second gauge index member;

Fig. 6 is a view in perspective of the caliper-like arm carried by the gauge disclosed in Fig. 4; and Fig. 7 is a view in perspective of the caliper-like arm carried by the gauge disclosed in Fig. 5.

It is well known in the shoe manufacturing art that the vamp and back seam measurements for a particular shoe in a certain size series, bears a definite relation to the measurements of the vamps and back seams of shoes of various widths in that series. Furthermore, the measurements of the vamps and back seams of shoes in other sizes of shoes of various widths in the other size series, have a definite relation to the measurements of a particular shoe in any other size series.

It has been, and at the present time is customary for a shoe dealer, when placing an order for shoes, to merely quote to the manufacturer that he desires shoes fabricated on the basis of, for example a 3 inch vamp on a 4—B shoe, and with this information, the shoe manufacturer is enabled to determine the corresponding vamp and back seam measurements for all the shoes of the various widths and lengths in the different size series from the single quotation submitted. Heretofore, a shoe manufacturer, on receiving the quotation, has been required to work out the various relations of the sizes of the vamp and back seams of the shoes by relative mathematics which resulted in considerable loss of time and economic waste.

By my invention, I provide a novel device whereby the various measurements of the vamps and back seams of shoes may be rapidly and efficiently determined for all sizes of shoes, and all widths in each size, from a single quoted size measurement in any specific size series.

Referring now more particularly to the drawing, a device made in accordance with my invention comprises a scale bar 1 on which are slidably mounted a pair of index elements 2 and 3 respectively, the said indexes each capable of being secured in a predetermined position on the scale bar 1 by means of suitable thumb screws 4 and 5 respectively. In the present instance, one side face of the scale bar 1 is suitably marked as at 6, designating the sizes and half sizes of ordinary shoe lengths. In a similar manner and on the same face of the scale bar 1 a group of markings 7 are provided suitably designating the various and customary widths of shoes. In the present instance the movable index elements 2 and 3 are arranged for cooperation with the scale markings 6 and 7 respectively.

Each of the index elements 2 and 3, is provided with depending portions 8 and 9 respectively, having horizontal slots 10 and 11 respectively therein. A talon or arm 12 is relatively fixed in the slot 10 of the index element 2, the said member 12 being secured therein by means of screws 13. A similar talon or arm 14 is slidably mounted in the slot 11 of the index gauge 3 and is capable of being secured in a predetermined position in said slot by means of a thumb screw 15. In the present instance the surface of the arm of the member 14 residing in the slot 11 of the index 3, corresponding to the marked face of the scale bar 1 is marked as at 16 designating the various vamp lengths that may be desired in a given shoe of a certain size series and arranged for cooperation with the aforementioned index element 3.

The operation of the vamp measuring device constituting my invention may be best illustrated by taking a specific example and progressing partially through a range of shoe sizes. Suppose for instance, that a retail shoe dealer prefers a style of shoe having vamp proportions based upon a 3 inch vamp on a 4—B shoe. The shoe manufacturer taking the instrument disclosed herein, places the scale 16 on the caliper 14 at the mark 3 thereon. The index element 2 is then moved on the scale bar 1 to the line numbered 4 of the marking group 6 and the index 3 is similarly positioned on the B line of the marking group 7. With the relative members of the device so positioned, the distance intermediate the caliper arms 12 and 14 respectively will be the distance that is required for a 3 inch vamp requisite for a 4—B shoe. The manufacturer, by subsequently positioning the index 3 on the various designated lines of the width marking group 7, such as at A, C, D, E, and taking the measurements intermediate the arms 12 and 14 respectively for each successive position on the scale 7, the resulting measurements will be the relative lengths of the vamps for all of the widths of a size 4 shoe based on the 3 inch vamp on a 4—B shoe.

In a similar manner, by successively positioning the index element 2 on the various size markings of the scale group 6, and repeating the successive measurements through the width scale 7 for each size position, the various relative vamp measurements for the different widths of various shoe sizes, may be quickly and accurately determined.

For the purpose of securing the relative measurements of the back seams for the widths of various groups of shoe sizes, a device substantially similar to that as disclosed in Fig. 1 of the drawing, is provided, the sole difference between the device for measuring the vamp lengths and the back seam heights being the selective positioning of the three groups of scale markings on the scale bar and talon or arm 14 respectively. The operation of the back height or seam measuring device is substantially the same as that set forth hereinbefore in conjunction with the vamp measurement device, the scale setting forth the back seam height being positioned corresponding to the vamp measurement scale 16 and the size and width designations being respectively positioned on the scale bar as in the device for measuring the vamps of shoes.

While I have disclosed the embodiment of my invention for the purpose of description, it is not my intention to be limited thereto except as set forth in the appended claims.

I claim:

1. In a gauge for footwear the combination with a bar having length and width scale markings grouped thereon, of a pair of index elements movable on said bar and arranged respectively for cooperation with said scale markings, a relatively fixed arm carried by one of said index elements, and an arm carried by the other of said index elements and movable with respect thereto, the said movable arm having a scale marked thereon and arranged for cooperation with the index element, cooperating in conjunction with the first mentioned index element, with the scale markings on the bar, to determine the measurements of certain parts of shoes having a definite relation to the length and width thereof, for all widths and sizes of shoes.

2. In a gauge for footwear the combination with a bar having width and length scale markings suitably grouped on one face thereof, of a pair of index elements movable on said bar and arranged respectively for cooperation with said scale markings, means for securing the said index elements in a predetermined position of the bar, a relatively fixed arm carried by one of said index elements, and a movable arm carried by the other of said index elements, the said movable arm having a scale marked thereon and arranged for cooperation with the index element, cooperating in conjunction with the first mentioned index element with the scale markings on the bar, to determine the measurements of certain parts of shoes having a definite relation to the length and width thereof, for all widths and sizes of shoes.

3. In a gauge for foot wear, the combination with a bar having width and length scale markings suitably grouped on one face thereof, of a pair of index elements movable on said bar and arranged respectively for cooperation with said scale markings, the said index elements having depending portions each provided with a slot therein disposed substantially parallel to the scale bar, means for securing the said index elements in a predetermined position on said bar, an arm relatively fixed in the slot of one of said index elements, and a movable arm positioned in the slot of the other of said index elements, the said movable arm having a scale marked thereon and arranged for cooperation with the index element cooperating in conjunction with the first mentioned index element, with the scale markings on the bar, to determine the measurements of certain parts of shoes having a definite relation to the length and width thereof for all widths and lengths of shoes.

4. In a gauge for footwear, the combination with a bar having width and length scale markings grouped thereon, of movable means on said bar arranged to cooperate with each of said scales, and a movable arm carried by one of said movable means the said arm having a scale marked thereon arranged to cooperate with said movable means in conjunction with the other movable means and the other scale on said bar to determine the measurements of certain parts of footwear having a definite relation to the length and width thereof.

5. In a gauge for determining the relative measurements of vamps and back seams of shoes having a definite relation with respect to the width and length of said shoes, the combination with a bar having a width and a length scale respectively marked thereon, a pair of index elements movable on said bar and arranged respectively for cooperation with said scales, and an arm carried by and relatively adjustable with respect to the index element cooperating with the width scale, the said arm having a scale marked thereon and arranged for cooperation with said index element in conjunction with the other index element and the length scale on the bar, to determine the measurements of certain parts of shoes having a definite relation to the length and width thereof.

SANTE BARONI.